US005644734A

United States Patent [19]
Hong

[11] Patent Number: 5,644,734
[45] Date of Patent: Jul. 1, 1997

[54] METHOD AND APPARATUS FOR MULTIPLEXING BUS CONNECTOR SIGNALS WITH SIDEBAND SIGNALS

[75] Inventor: Soon Chul Hong, San Diego, Calif.

[73] Assignee: NCR Corporation, Dayton, Ohio

[21] Appl. No.: 518,739

[22] Filed: Aug. 24, 1995

[51] Int. Cl.⁶ .......................... G06F 13/38; G06F 13/40
[52] U.S. Cl. ................................. 395/309; 395/882
[58] Field of Search ................... 395/306, 308, 395/309, 882, 892

[56] References Cited

U.S. PATENT DOCUMENTS

| | | | |
|---|---|---|---|
| 5,450,551 | 9/1995 | Amini et al. | 395/299 |
| 5,507,002 | 4/1996 | Heil | 395/828 |
| 5,528,764 | 6/1996 | Heil | 395/293 |
| 5,533,204 | 7/1996 | Tipley | 395/288 |
| 5,557,757 | 9/1996 | Gephardt et al. | 395/306 |

OTHER PUBLICATIONS

"PCI Local Bus Specification", Production Version, Revision 2.0, PCI Special Interest Group, Apr. 30, 1993.

*Primary Examiner*—Gopal C. Ray
*Attorney, Agent, or Firm*—Merchant, Gould, Smith, Edell, Welter & Schmidt

[57] ABSTRACT

A method and device for multiplexing temporally constant signals from a PCI compliant device with sideband signals on an interface connector coupled between the PCI compliant device and an external device. The device comprises a control signal generator coupled to the interface connector for generating a control signal, and a selectable connector, responsive to the control signal for alternatively coupling the sideband signals and the temporally constant signals to the interface connector. The method comprises the steps of receiving a command signal in the PCI compliant device from the interface connector, generating a pulse in response to the command signal, isolating the sideband signals from the interface connector in response to the leading edge of the pulse, applying the temporally constant signals to the interface connector until they are stored in the external device, isolating the temporally constant signals from the interface connector, and applying the sideband signals to the interface connector in response to the trailing edge of the pulse.

32 Claims, 10 Drawing Sheets

METHOD AND APPARATUS FOR MULTIPLEXING BUS CONNECTOR SIGNALS WITH SIDEBAND SIGNALS

BACKGROUND OF THE INVENTION

1. Field of the Invention

The present invention relates generally to signal multiplexing on an interface bus, and in particular, to a method and apparatus for multiplexing PCI bus connector signals with sideband signals.

2. Description of Related Art

The Peripheral Component Interconnect (PCI) local bus is a high performance 32 or 64 bit bus with multiplexed address and data lines. The PCI Local Bus Specification, Rev. 2.0, incorporated by reference herein, defines the protocol, electrical, mechanical, and configuration specifications for PCI Local Bus components and expansion boards. The PCI local bus defines an industry standard high performance low cost local bus architecture. The PCI component and add-in card interface is also processor independent, enabling an efficient transition to future processor generations and ensuring compatibility with multiple processor architectures. The processor independence allows the PCI local bus to be optimized for input/output (I/O) functions, enabling concurrent operations of the local bus with the processor/memory subsystem, and accommodating multiple high performance peripherals in addition to graphics such as motion video, LAN, SCSI, FDDI, hard disk drives. High bandwidth I/O items such as enhanced video, multi-media displays and high definition TV, will continue to increase local bus bandwidth requirements. The PCI interface supports high bandwidth I/O, and is therefore highly suited to these applications. The PCI interface is also particularly useful for interconnecting high integrated peripheral controller components, peripheral add-in boards, and processor/memory systems.

The PCI interface standard offers other benefits as well. Configuration registers are specified for PCI components than add-in cards. A system with embedded auto configuration software offers true ease of use for the system user by automatically configuring PCI add-in cards at power on.

One limitation of the PCI local bus is that the PCI connector has no pins for sideband signals. Without sideband signal pins, sideband signals cannot be implemented directly on the interface connector. Sideband signals are loosely defined as any signal not part of the PCI specification that connects two or more PCI compliant agents, and has meaning only to these agents. Sideband signals may be used for two or more devices to communicate some aspect of their device-specific state in order to improve the overall effectiveness of PCI utilization or system operation. Flush request and acknowledge signals are used as an example here, but the present invention could be applied to any other two additional pin requirements on a PCI connector. For example, the present invention could be used to extend two data bus signals of the Interrupt Controller Communication (ICC) bus for Intel's APIC (Advanced Programmable Interrupt Controller). New system designs may need to connect an existing legacy bus such as an EISA/ISA or MCA through several hierarchical PCI bridges, typically mounted on a PCI add-in card rather than in a plenary implementation such as a motherboard. Since a legacy bus usually lacks a back-off capability, at least two sideband signals, flush request and flush acknowledge, must be routed throughout the bus hierarchy (from a legacy bus to a host bridge) to avoid deadlock. Deadlock may occur when a downstream operation to the legacy bus module and an upstream operation from that legacy bus module are initiated concurrently. Normally, these signals would be provided by sideband signals. As mentioned earlier, the standard PCI interface does not provide sideband signaling capability. The present invention solves this problem by multiplexing these sideband signals in the PRSNT 1# and PRSNT 2# signals of the standard PCI connector.

SUMMARY OF THE INVENTION

To overcome the limitations in the prior art described above, and to overcome other limitations that will be apparent upon reading and understanding the present specification, the present invention discloses a method and apparatus for multiplexing temporally constant signals from a PCI compliant device with sideband signals on an interface connector.

The multiplexing device comprises a control signal generator coupled to the interface connector for generating a control signal in response to a command signal from the interface connector and a selectable connector coupled to the temporally constant signals from the PCI compliant device, the sideband signals, the interface connector and the control signal generator. In one embodiment, the command signal is the RST# signal and the temporally constant signals are the PRSNT 1# and PRSNT 2# signals on the PCI interface. The selectable connector alternatively couples the sideband signals and the temporally constant signals to the interface connector according to the control signal from the control signal generator. The control signal generator further comprises a pulse generator for generating a pulse and a control signal generating means coupled to the pulse generator. The pulse generator may be a simple one shot, or comprise a plurality of delay flip flops coupled in series to create a pulse of suitable length.

In an alternative embodiment, the multiplexing device comprises a control signal generator coupled to the interface connector for generating an isolating signal in response to a command signal from the interface connector, a store command generator coupled to the control signal generator for generating a store command in response to the isolating signal, a selectable connector coupled to the interface connector, the control signal generator and the sideband signals, and a memory, coupled to the interface connector, the external device, and the store command generator. The selectable connector couples/isolates the sideband signals to/from the interface connector in response to the isolating signal. Further, the memory stores the temporally constant signals in response to the store command.

The present invention also discloses a method of multiplexing temporally constant signal from a PCI compliant device with sideband signals. The method of multiplexing comprises the steps of receiving a command signal in the PCI compliant device from the interface connector, generating a pulse in the PCI compliant device in response to the command signal on the interface connector, isolating the sideband signals from the interface connector in response to the leading edge of the pulse, applying the temporally constant signal to the interface connector until the temporally constant signal is stored in the external device, isolating the temporally constant signal from the interface connector in response to the trailing edge of the pulse, and applying the sideband signals to the interface connector in response to the trailing edge of the pulse. In an alternative embodiment the multiplexing method comprises the steps of receiving a command signal in the external device from the interface connector, generating a pulse in the external device in response to the command signal from the interface connector, isolating the sideband signals from the interface connector in response to the leading edge of the pulse, storing the temporally constant signal in the second PCI compliant device, and applying the sideband signals to the interface connector in response to the trailing edge of the pulse.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention provides sideband signals on a PCI interface by multiplexing the desired sideband signal with the PRSNT 1# signal and the PRSNT 2# signal on the standard PCI interface connector. These signals are present on the PCI connector and are used for two purposes: they indicate that a board is physically present in the PCI slot, and they provide information about the total power requirements of the board. For example, when the PRSNT 1# signal and the PRSNT 2# signal are both open, the expansion board is present. Maximum card power dissipation is also encoded on the PRSNT 1# and PRSNT 2# terms of the connector. When the PRSNT 1# signal is grounded and the PRSNT 2# signal is open, this indicates that an expansion board is present and the maximum card power dissipation is 25 watts maximum. Also, when the PRSNT 1# signal is open and the PRSNT 2# signal is grounded, this indicates that an expansion board is present and the maximum card power dissipation is 15 watts maximum. Finally, if both PRSNT signals are grounded, this indicates that an expansion board is present, and the maximum card power dissipation is 7.5 watts maximum. Further details of the PRSNT 1# and PRSNT 2# signals can be found in the PCI Local Bus Specification, Rev 2.0, incorporated by reference herein. Since the PRSNT 1# and PRSNT 2# signals do not change over time, they are temporally constant, are used by the present invention to provide sideband signaling capability. This is accomplished by applying the PRSNT 1# and PRSNT 2# signals to the interface connector, storing the values of these signals, isolating these signals from the interface connector, and finally applying the desired sideband signals to the interface connector pins formerly containing the PRSNT 1# and PRSNT 2# data. This process is normally initiated at startup in response to the RST# signal on the interface connector.

Figure 1:
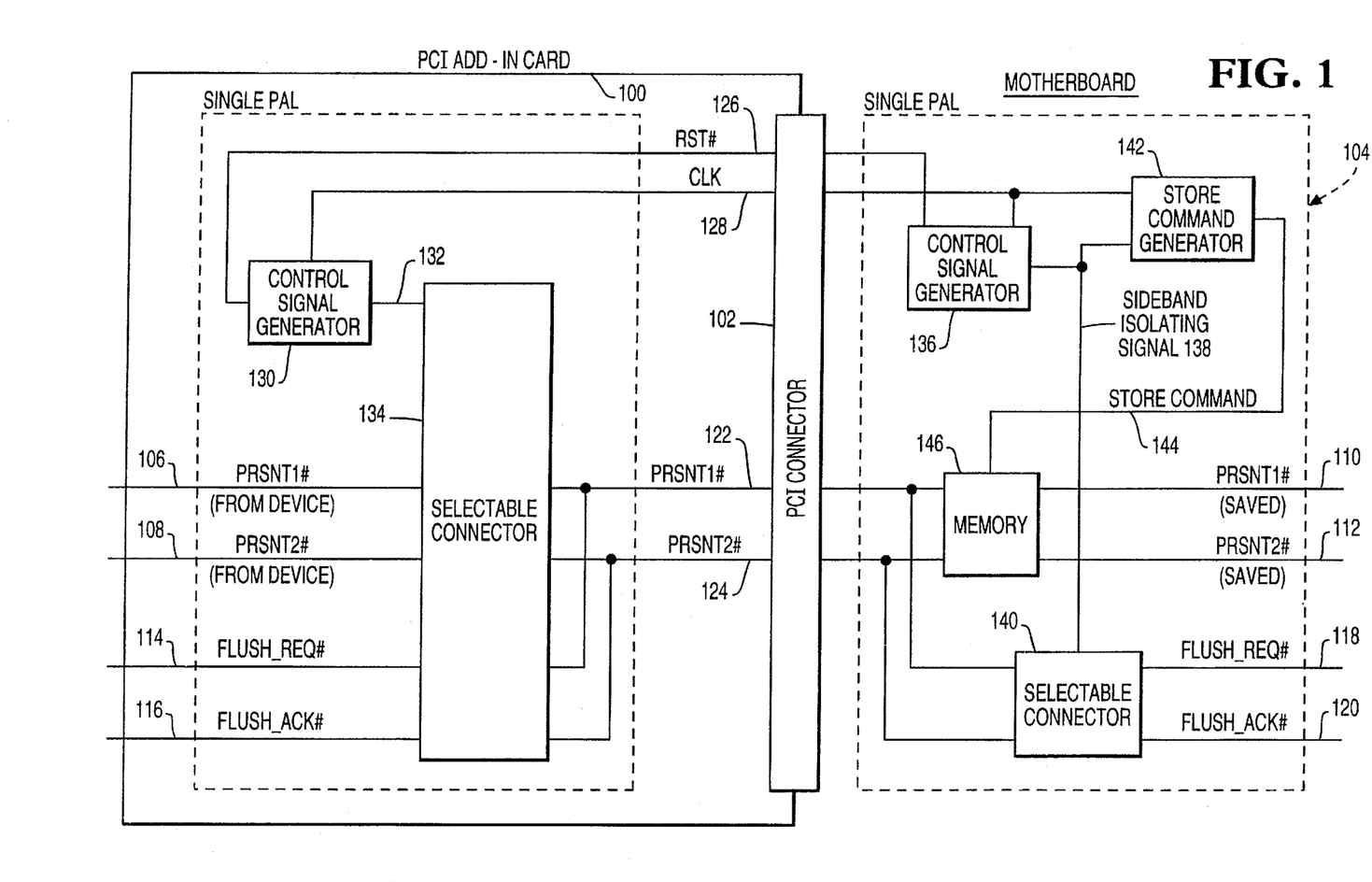
FIG. 1 is a block diagram illustrating the present invention.

FIG. 1 is a block diagram illustrating one possible embodiment of the present invention. As shown in FIG. 1, a PCI add-in card 100 is connected to a motherboard 104 by a PCI connector 102. As previously described, the PRSNT 1# and PRSNT 2# signals from the PCI add-in card provide information regarding the presence and power consumption of the PCI add-in card. Normally, the PRSNT 1# signal 106 and the PRSNT 2# signal 108 are provided to the motherboard 104 via the PCI connector 102, specifically the PRSNT 1# signal pin 122 and the PRSNT 2# signal pin 124. In the present invention, the values at the PRSNT 1# signal pin 122 and the PRSNT 2# signal pin 124 are stored within the motherboard 104 and are therefore made available as the PRSNT 1# saved signal 110 and the PRSNT 2# saved signal 112.

While the present invention can be used to multiplex any sideband signal with the PRSNT 1# 106 and PRSNT 2# 108 signals, FIG. 1 describes a more specific implementation which solves the deadlock situation previously described. As shown in FIG. 1, the flush request signal can be provided to either the PCI add-in card 100 or the motherboard 104. When provided by the PCI add-in card, the signal is the FLUSH_REQ# signal 114, and when provided by the motherboard 104, the flush request signal is the FLUSH_REQ# signal 118. Similarly, the flush acknowledge signal is denoted by FLUSH_ACK# and is provided to the PCI add-in card and the motherboard 104 by the signals labeled 116 and 120, respectively.

The PCI connector 102 also carries two other important signals that are used in the present invention. The first such signal is the RST# signal 126, which is provided on the PCI connector 102 shortly after motherboard 104 power-up. The RST# signal 126 is provided to the PCI compliant device control signal generator and the motherboard control signal generator 136. The other important signal pin on the PCI connector 102 is the CLK signal 128 which is the clock signal from the motherboard 104. The clock signal 128 is provided to the PCI control signal generator 130, the motherboard control signal generator 136, and the store command generator 142 in the motherboard 104.

The operation of the present invention will now be described. The RST# signal 126 is provided to the control signal generator 130 in the PCI add-in card 100. As previously described, this signal is normally provided on power-up, but those skilled in the art will note that the present invention may be practiced using any comparable signal to initiate the process described herein. The control signal generator uses the RST# signal 126 to generate a control signal 132. The control signal is a pulse of a duration as specified herein. The control signal 132 is provided to the selectable connector 134. The selectable connector 134 is coupled to the PRSNT 1# signal 106 and the PRSNT 2# signal 108. The selectable connector 134 is also coupled to the FLUSH_REQ# 114 signal and the FLUSH_ACK# 116 signal, and the PRSNT 1# signal pin 122 and PRSNT 2# signal pin 124 on the PCI connector 102. In response to the control signal 132, the PCI compliant device selectable connector 134 connects the PRSNT 1# signal 106 and the PRSNT 2# signal 108 to the PRSNT 1# signal pin 122 and the PRSNT 2# signal pin 124. At or near the same time, the PCI compliant device selectable connector 134 isolates the FLUSH_REQ# signal 114 and the FLUSH_ACK# 116 from the PRSNT 1# signal pin 122 and the PRSNT 2# signal pin 124 on the PCI connector 102. When the control signal 132 again changes state, the PCI compliant device selectable connector 134 isolates the PRSNT 1# signal 106 and the PRSNT 2# signal 108 from the PRSNT 1# signal pin 122 and the PRSNT 2# signal pin 124 on the PCI connector 102. Similarly, at or near the same time, the PCI compliant device selectable connector 134 FLUSH_REQ# signal 114 and the FLUSH_ACK# signal 116 are the PRSNT 1# signal pin 122 and the PRSNT 2# signal pin 124.

The RST# signal 126 is also provided to a motherboard control signal generator 136. The motherboard control signal generator 136 operates substantially the same as the PCI compliant device control signal generator 130. The motherboard control signal generator 136 generates an isolating signal 138 which is applied to the motherboard selectable connector 140. The motherboard selectable connector 140 is coupled to the PRSNT 1# signal pin 122 and the PRSNT 2# signal pin 124. The motherboard selectable connector 140 is also coupled to the FLUSH_REQ# signal 118 and the FLUSH_ACK# signal 120 for sideband signal communication. When provided with the isolating signal 138, the motherboard selectable connector 140 isolates the FLUSH_REQ# signal 118 and the FLUSH_ACK# signal 120 from the PRSNT 1# signal pin 122 and the PRSNT 2# signal pin 124 respectively.

In the present invention, before the PRSNT 1# signal pin 122 and the PRSNT 2# signal pin 124 are used for sideband signals, these signals are stored in the memory 146 of the motherboard 104 and made available as the PRSNT 1# saved signal 110 and the PRSNT 2# saved signal 112 respectively. The memory 146 stores the signals on the PCI connector 102 in response to the store command 144. The store command 144 is generated by the store command generator 142 which is coupled to the sideband isolating signal 138.

Figure 2:
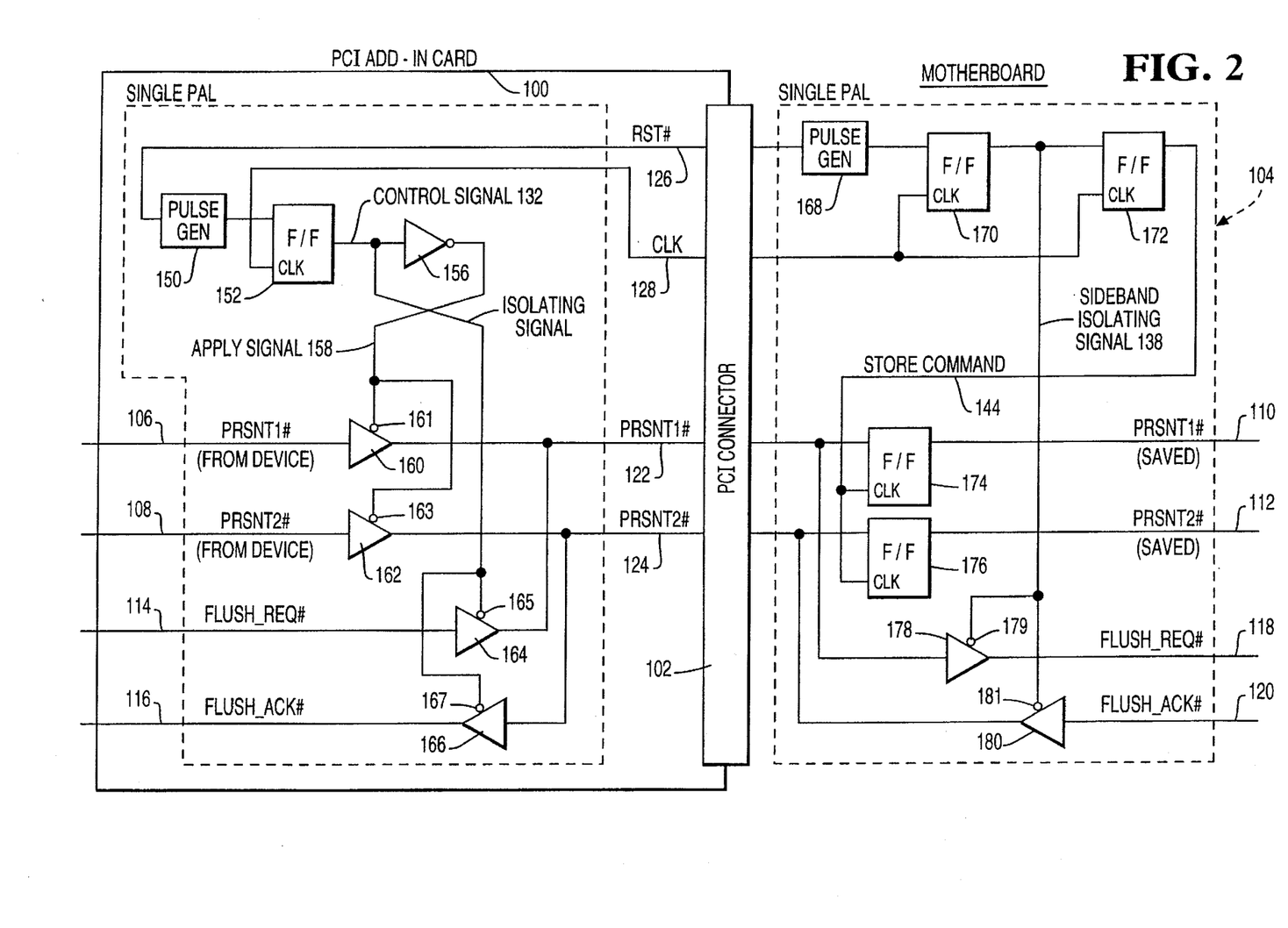
FIG. 2 is a schematic diagram of one embodiment of the present invention.

FIG. 2 is a schematic diagram of one embodiment of the present invention. As shown in FIG. 2, the PCI compliant device control signal generator 130 comprises a PCI compliant device pulse generator 150 coupled to a PCI compliant device flip flop 152, thereby providing the control signal 132. The pulse generator 150 provides a pulse with a specified duration to the PCI compliant device flip flop 152 which, when clocked by the CLK 128 signal from the PCI connector 102, thereby generates the control signal 132. As described herein, the pulse must last long enough to store the temporally constant signals in the memory 135. In most cases, this will be at least three cycles of the CLK# signal 125. As shown in FIG. 2, the motherboard control signal generator 136 is similarly constructed.

FIG. 2 also shows an embodiment of the PCI compliant device selectable connector 134. As shown in FIG. 2, the PCI compliant device selectable connector 134 comprises an inverter 156 and a plurality of tri-state output buffers 160, 162, 164, and 166. The inverter 156 is coupled to the PCI compliant device flip flop 152 thereby generating an apply signal 158 from the control signal 132. Tri-state output buffer 160 is coupled between the PRSNT 1# signal 106 and the PRSNT 1# signal pin 122.

When the tri-state output 160 is supplied with a logical 0 at the tri-state output buffer control input 161, the PRSNT 1# signal 106 is applied to the PRSNT 1# signal pin 122 on the PCI connector 102. Tri-state output buffers 162, 164 and 166 operate the same way. Of course, the present invention could be implemented in other ways without departing from the invention. For example, the tri-state output buffers could be implemented as AND gates, using an inverted input to the gate for a control input. Since the tri-state output buffer control input 161 is coupled to the apply signal 158, when the apply signal 158 is a logical 0, the PRSNT 1# signal 106 is applied to the PRSNT 1# signal pin 122. When the apply signal 158 is a logical 1, the aforementioned signals are isolated from the PCI connector 102. The sideband signals 114 and 116 are likewise applied and isolated from the PCI connector 102 in the same way, however, in response to the isolating signal 154. Since the isolating signal 154 and the apply signal 158 are logical complements of one another, the selectable connector 134 alternately applies either the PRSNT signals or the sideband signals to the PCI connector 102 in response to the control signal 132.

FIG. 2 also shows how one embodiment of the present invention is implemented on the motherboard 104. The motherboard control signal generator 136 comprises a motherboard pulse generator 168 coupled to a control flip flop 170. The motherboard control signal generator 136 operates in substantially the same way as the PCI compliant device control signal generator 130. It is important in the present invention that the pulses generated by the control flip flop 170 and the PCI compliant device flip flop 152 are of substantially the same timing and duration, thus assuring that the PRSNT signals are applied, stored, and isolated in the proper logical sequence. Using the control flip flop output 170, the motherboard control signal generator 136 generates a sideband isolating signal 138 which is supplied to the motherboard selectable connector 140.

As shown in FIG. 2, the motherboard selectable connector 140 comprises tri-state output buffers 178 and 180. These buffers are coupled between the PRSNT 1# signal pin 122, the PRSNT 2# signal pin 124 and the FLUSH_REQ# signal 118 and the FLUSH_ACK# signal 120, respectively. The tri-state output buffers 178 and 180 include control inputs 179 and 181 which are coupled to the sideband isolating signal 138. When the sideband isolating signal 138 is a logical 1, the FLUSH_REQ# signal 118 and FLUSH_ACK# signal 120 are isolated from the PCI connector 102. Alternately, when the sideband isolating signal 138 is a logical 0, the FLUSH_REQ# signal 118 and the FLUSH_ACK# signal 120 are applied to the PCI connector 102.

FIG. 2 also illustrates the operation of the memory 146 and the store command generator 142, showing one embodiment of the store command generator 142. In the illustrated embodiment, the store command generator 142 comprises a store command flip flop 172. The input of the store command flip flop 172 is coupled to the output of the control flip flop 170. Hence, the store command flip flop 172 generates a store command 144 one clock pulse after the control flip flop 170 generates the sideband isolating signal 138. The store command 144 is provided to the memory 146 and used to command the memory 146 to store the signals at the PRSNT 1# signal 122 and the PRSNT 2# signal 124. FIG. 2 shows one embodiment of the memory 146 in the present invention. As shown in FIG. 2, the memory 146 comprises store flip flops 174 and 176, each coupled to one of the PRSNT pins on the PCI connector 102. Also, flip flops 174 and 176 are provided with the store command 144 which is input to the clock input of each flip flop. Consequently, each store flip flop 174 and 176 will store the PCI connector 102 signals when provided with the store command 144, thereby providing the PRSNT 1# saved signal 110 and the PRSNT 2# saved signal 112.

Figure 3:
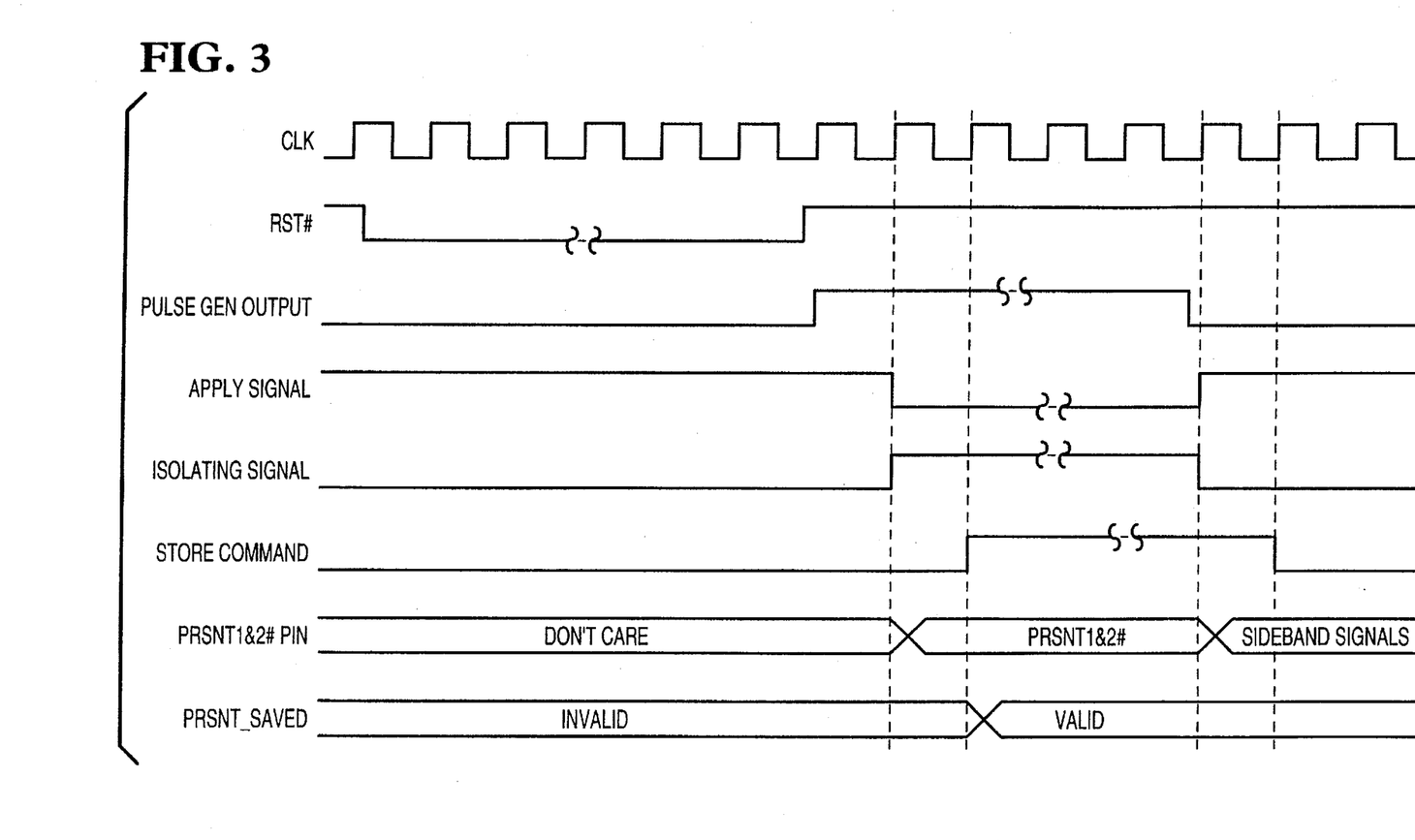
FIG. 3 is a diagram illustrating the logical operation of the present invention.

FIG. 3 is a timing diagram illustrating the logical operation of the present invention. FIG. 3 shows the RST# signal 126, the CLK signal 128, the pulse generator 150 output, the apply signal 158, the isolating signal 154, the store command 144, and the signals contained on the PRSNT 1# signal pin 122 and the PRSNT 2# signal pin 124. As noted on FIG. 3, and consistent with the PCI Local Bus Specification, signals denoted with a # symbol are normally a logical 1 and activated when they are set to a logical 0. As described earlier, the CLK signal 128 is available to either the PCI add-in card 100 or the motherboard 104 by the PCI connector 102. This CLK 128 signal is used to provide logical timing for the present invention. When the RST# signal 126 is applied, the PCI compliant device pulse generator 150 and the motherboard pulse generator 168 both generate a pulse. As shown in FIG. 3, this pulse need not be of lengthy duration, and need only be of sufficient duration to allow the signals on the PRSNT 1# signal pin 122 and the PRSNT 2# signal pin 124 to be stored before the sideband signals are applied. As shown in FIG. 3, the apply signal 158 is generated one clock pulse after the output of the pulse generator 150 becomes a logical high. This apply signal 158 causes the PRSNT 1# signal 106 and the PRSNT 2# signal 108 to be applied to the PRSNT 1# signal pin 122 and the PRSNT 2# signal pin 124 on the PCI connector 102. At the same time, since the isolating signal 154 is the logical complement of the apply signal 158, the sideband signals FLUSH_REQ# signal 114 and the FLUSH_ACK# signal 116 are isolated from the PCI connector 102. The FLUSH_REQ# signal 118 and the FLUSH_ACK# signal 120 are also isolated from the PCI connector 102 at this time. This is accomplished using a sideband isolating signal 138 generated from the motherboard control signal generator 136, which operates in the same manner as the PCI compliant device control signal generator 130. Hence, the sideband isolating signal 138 and the isolating signal 154 change to the same states at substantially the same time. After the sideband signals have been isolated from the PCI connector 102, a store command is generated one pulse later by the store command flip flop 172. Thereafter, the value on the PRSNT 1# signal pin 122 and the PRSNT 2# signal pin 124 are stored by the memory 146. In response to the trailing edge of the pulse generated by the pulse generators 150 and 168 the apply signal 158 is removed and the isolating signals 154 and 138 are removed thus allowing the sideband signals to be provided to the PRSNT 1# signal pin 122 and the PRSNT 2# signal pin 124, and simultaneously isolating the PRSNT 1# signal 106 and the PRSNT 2# signal 108 from the PCI connector 102.

Figure 4:
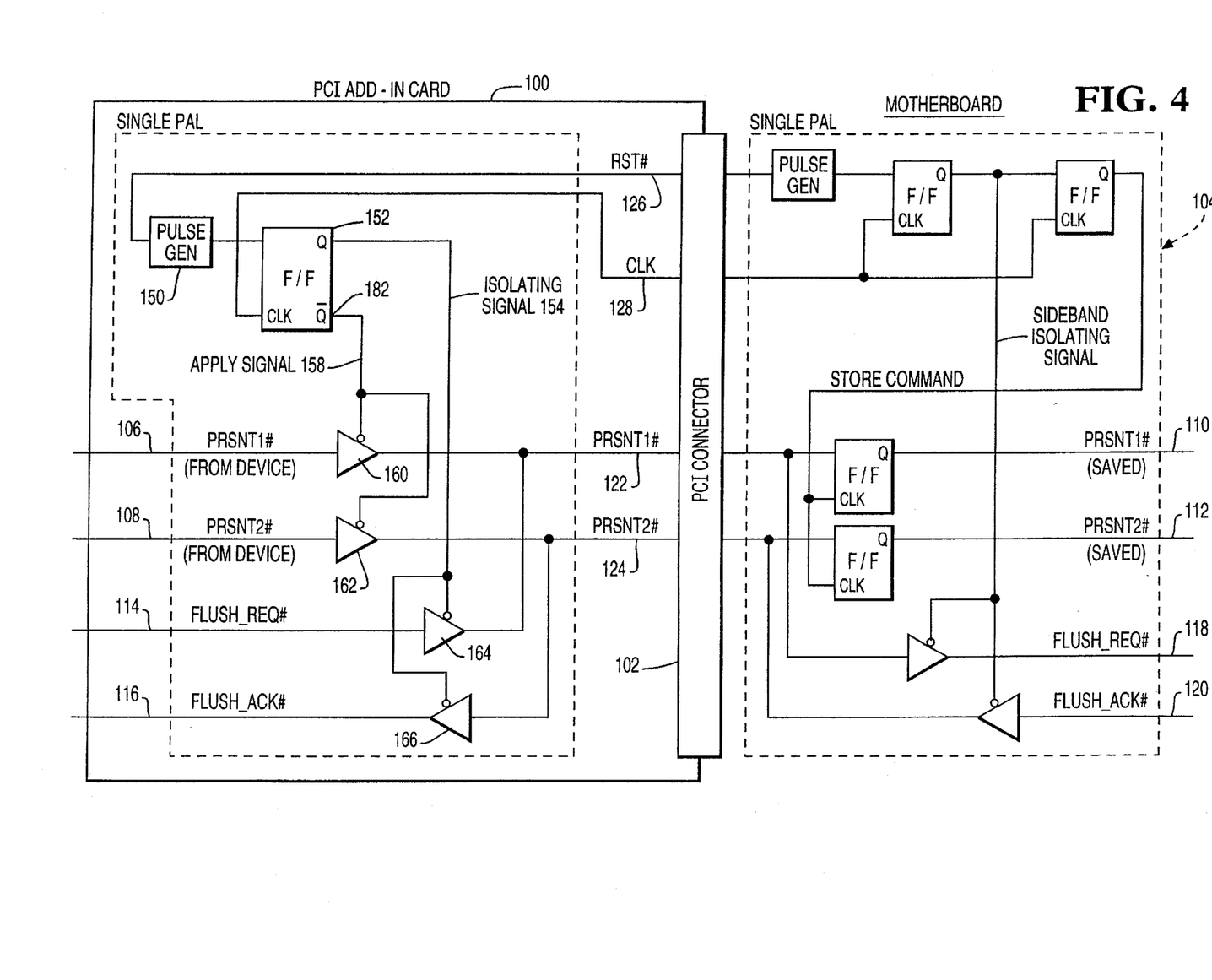
FIG. 4 is a schematic diagram of an alternative embodiment for the selectable connector of the present invention.

FIG. 4 is a schematic diagram of a second embodiment of the present invention. As shown in FIG. 4, the inverter 156 can be eliminated by using an inverted output 182 of the flip flop 152.

Figure 5:
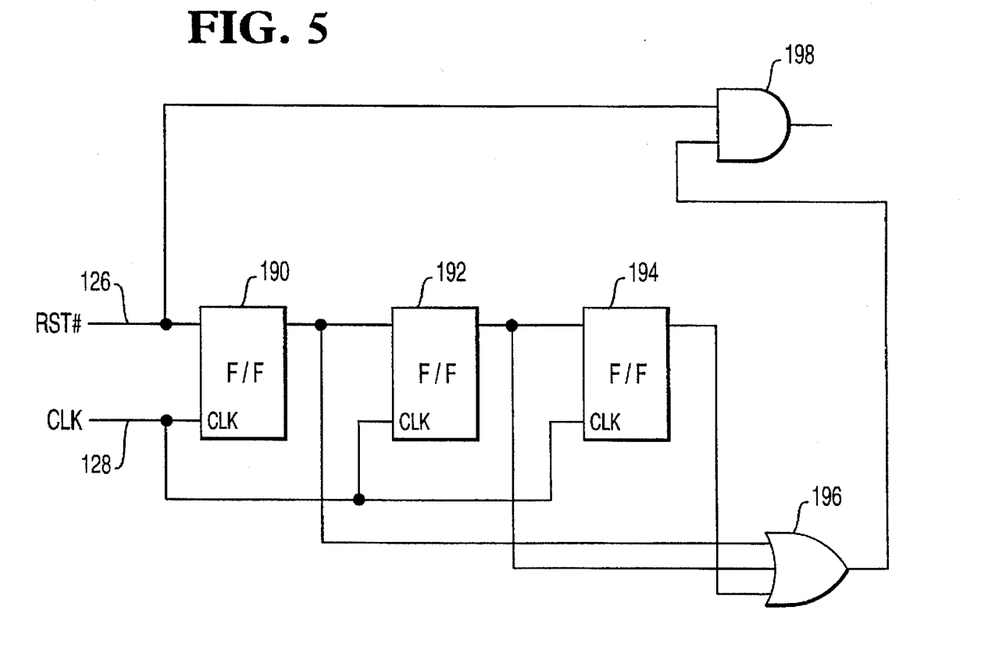
FIG. 5 is a schematic diagram showing an alternative embodiment for the pulse generator of the present invention.

FIG. 5 is a schematic diagram showing an alternative embodiment for the pulse generator of the present invention. As shown in FIG. 5, a pulse of sufficient duration can be generated using a plurality of flip flops 190, 192 and 194. In this embodiment, the RST# signal 126 is coupled to a first pulse generator flip flop 190. The output of the first pulse generator flip flop 190 is coupled to the input of a second pulse generator flip flop 192. Similarly, the output of the second pulse generator flip flop 192 is coupled to the input of a third pulse generator flip flop 194. Flip flops 190, 192 and 194 are clocked by the CLK signal 128. Also, the output of the first, second and third pulse generator flip flops 190, 192, 194 are provided to an OR gate 196. The output of the OR gate 196 and the RST# signal 126 are then applied to an AND gate 198. This circuit provides a pulse that is three clock periods in duration. Since the clock pulse period for the PCI interface is about 30 nanoseconds in duration, this configuration results in a 90 nanosecond pulse which is nominally sufficient to practice the present invention. This implementation using a series of flip flops allows the entire logic to be contained on a single programmable array logic (PAL). The same functionality for the pulse generator can be obtained using a simple one shot device.

Figure 6:
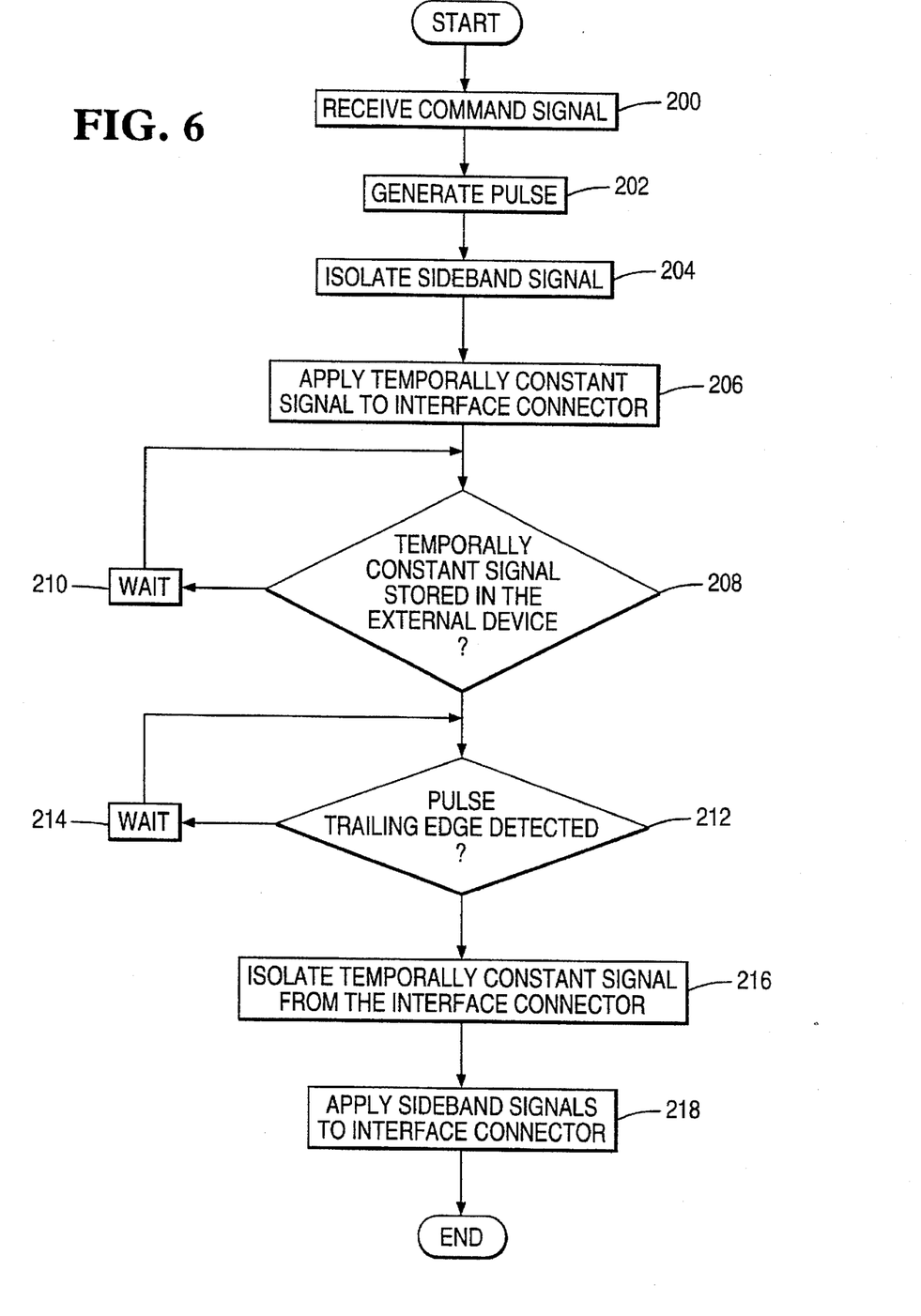
FIG. 6 is a flow chart showing the top level operations of the present invention.

FIG. 6 is a flow chart showing the top level operations used in the method of multiplexing temporally constant signals from a PCI compliant device with sideband signals. As shown in FIG. 6, the process begins when the PCI compliant device receives a command signal 200. As previously described, this command signal is normally the RST# signal in the PCI connector 102. After receiving a command signal, a pulse is generated 202 and this pulse is used to isolate the sideband signal 204 from the PCI connector 102. After the sideband signal is isolated, the temporally constant signal is then applied to the interface connector 206. In the embodiment previously described, the temporally constant signal includes the PRSNT 1# and PRSNT 2# signals. The PCI compliant device then waits until the temporally constant signal is stored in the external device 208. When a pulse trailing edge is detected 212, the temporally constant signal is isolated from the interface connector 216 and the sideband signals are applied to the interface connector 218. Operations denoted in FIG. 6 and all subsequent figures which comprise additional operations are hereafter indicated by a shadowed box. Further details of the operations performed to practice the present invention are presented in FIGS. 7–14.

Figure 7:
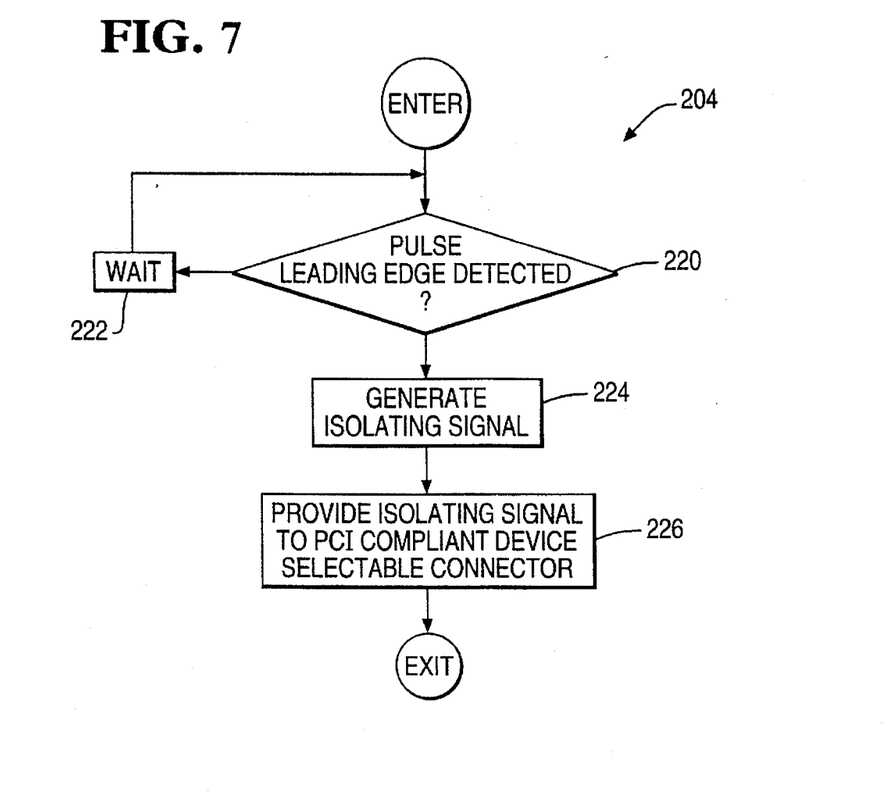
FIG. 7 is a flow chart showing the sideband isolating operations of the present invention.
Figure 8:
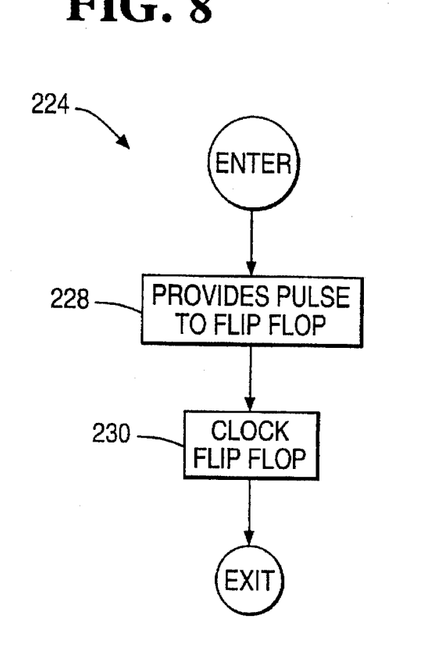
FIG. 8 is a flow chart showing the isolating signal generation operations of the present invention.
Figure 9:
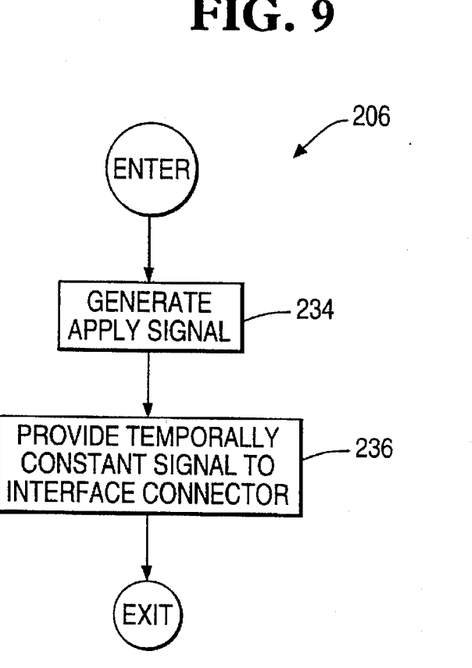
FIG. 9 is a flow chart showing the operations used to apply a temporally constant signal to the interface connector in the present invention.
Figure 10:
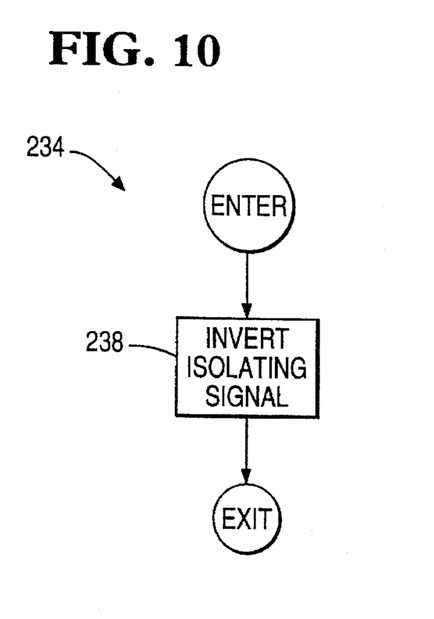
FIG. 10 is a flow chart showing the operations used to generate the apply signal in the present invention.
Figure 11:
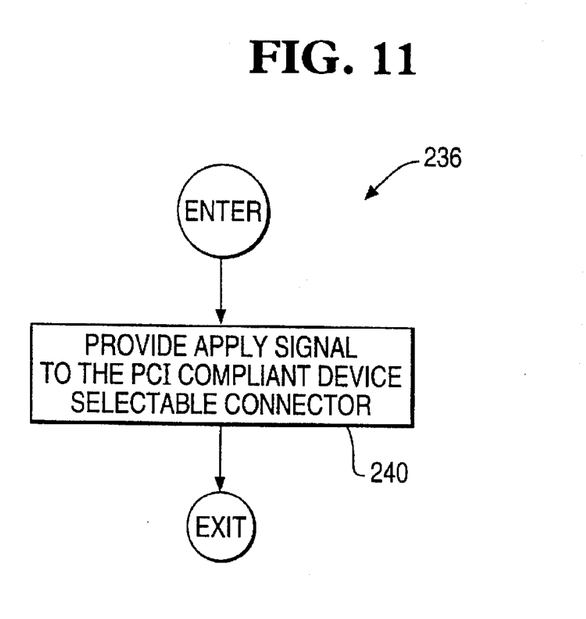
FIG. 11 is a flow chart showing the operations used to provide a temporally constant signal to the interface connector in the present invention.
Figure 12:
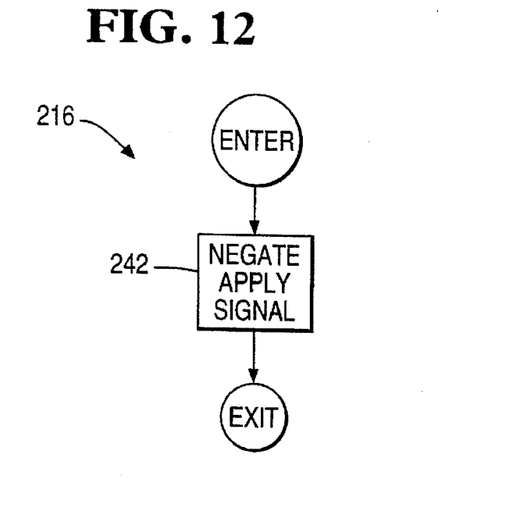
FIG. 12 is a flow chart showing the operations used to isolate the temporally constant signal from the interface connector in the present invention.
Figure 13:
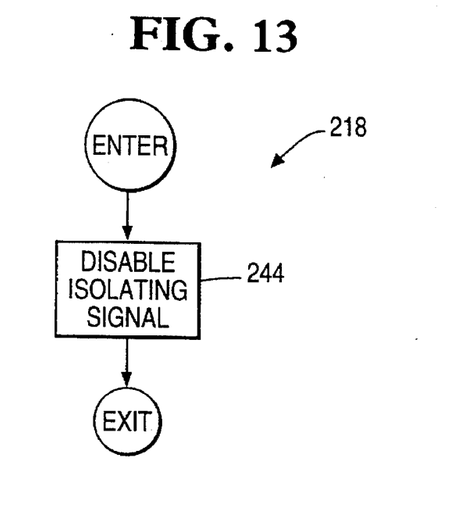
FIG. 13 is a block diagram showing the operations used to apply sideband signals to the interface connector in the present invention.

FIG. 7 is a flow chart showing the sideband isolating operations of the present invention. As shown in FIG. 6, the sideband signal is isolated when the pulse leading edge is detected 220. When the pulse is detected, an isolating signal is generated 224 and provided to the PCI compliant device selectable connector 226. FIG. 8 is a flow chart showing the isolating signal generation operations of the present invention. As shown in FIG. 8, the isolating signal is generated by providing a pulse to a flip flop 228 and thereafter clocking the flip flop 230. FIG. 9 is a flow chart showing the operations used to apply the temporally constant signals to the interface connector in the present invention. As shown in FIG. 9, this is accomplished by generating an apply signal 234 and providing the temporally constant signals to the interface connector in response to the apply signal 236. As shown in FIG. 10, the apply signal is generated by inverting the isolating signal 238. Further, as shown in FIG. 11, the temporally constant signal is applied to the interface connector by providing the apply signal to the PCI compliant device selectable connector 240. FIG. 12 is a flow chart showing the operations used to isolate the temporally constant signal from the interface connector in the present invention. As shown in FIG. 12, this is accomplished by negating the apply signal 242. Finally, FIG. 13 is a flow chart showing the operations used to apply sideband signals to the interface connector in the present invention. As shown in FIG. 13, this is accomplished by disabling the isolating signal 244.

Figure 14:
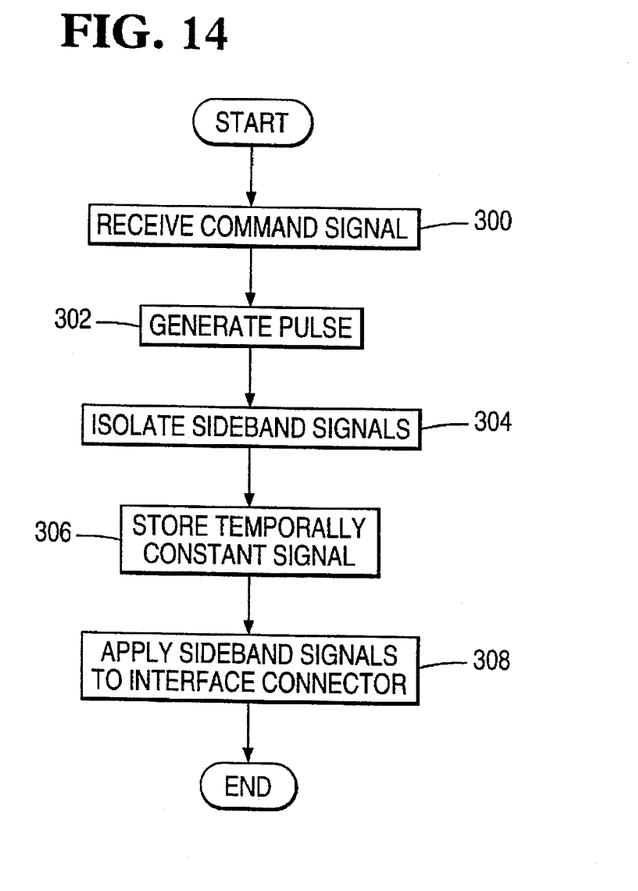
FIG. 14 is a flow chart showing the top level operations of another embodiment of the present invention.

FIG. 14 is a flow chart showing the top level operations of another embodiment of the present invention. As shown in FIG. 14, the method of multiplexing temporally constant signals from a PCI compliant device with sideband signals comprises the operations of receiving a command signal 300, generating a pulse in response to the command signal 302, isolating the sideband signals from the PCI interface connector 304, storing the temporally constant signal 306, and applying the sideband signals to the interface connector 308.

Figure 15:
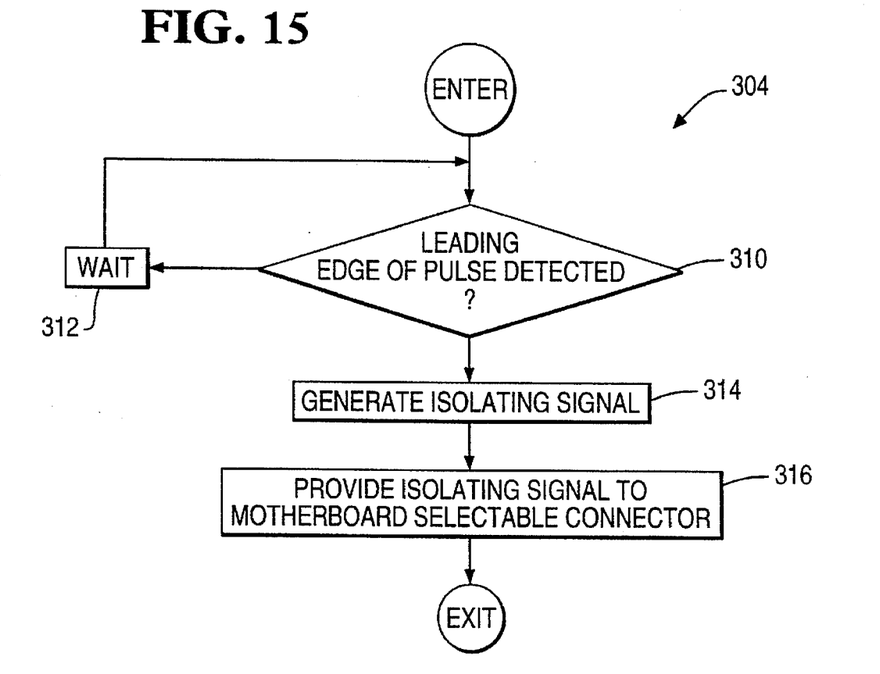
FIG. 15 is a flow chart showing the sideband isolating operations of another embodiment of the present invention.

FIG. 15 is a flow chart showing the sideband isolating operations of another embodiment of the present invention.

FIGS. 16–20 further describe the details of the operations shown in FIG. 15.

Figure 16:
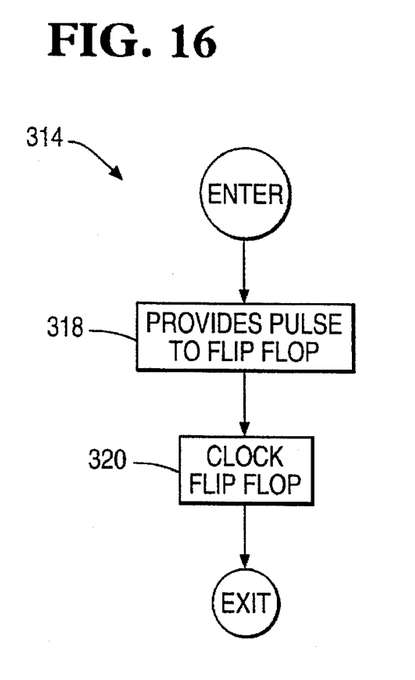
FIG. 16 is a flow chart showing the operations used to generate the isolating signal in another embodiment of the invention.

FIG. 16 illustrates how when the leading edge of a pulse is detected 310, the isolating signal is generated 314 and provided to the motherboard selectable connector 316. As shown in FIG. 16, the operations to generate the isolating signal include providing the pulse to a flip flop 318 and clocking the flip flop 320.

Figure 17:
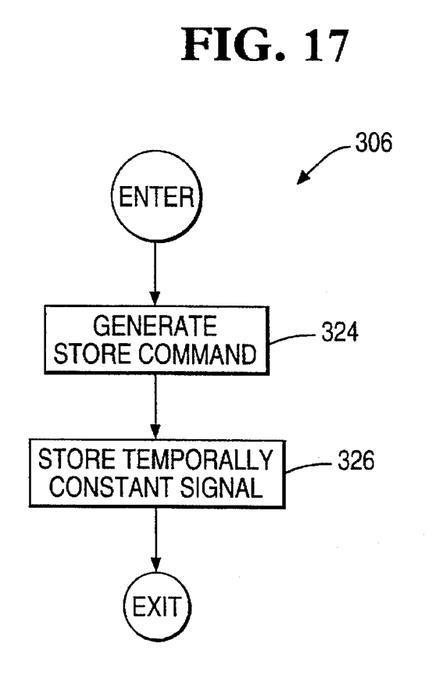
FIG. 17 is a flow chart showing the operations used to store the temporally constant signal in another embodiment of the present invention.

FIG. 17 is a flow chart showing the operations used to store the temporally constant signal in another embodiment of the present invention. As shown in FIG. 17, the temporally constant signal is stored by generating a store command 324 and storing the temporally constant signal 326 in response to the store command.

Figure 18:
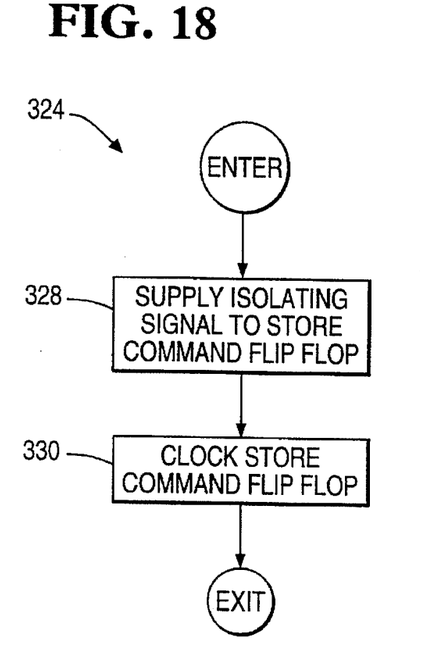
FIG. 18 is a flow chart of the operations used to generate a store command in another embodiment of the present invention.

FIG. 18 shows the operations performed to generate the store command, which includes supplying an isolating signal to the store command flip flop 328 and clocking the store command flip flop 330.

Figure 19:
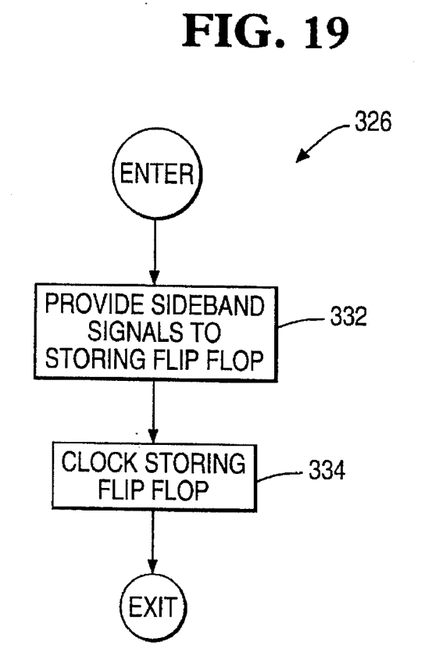
FIG. 19 is a flow chart of the operations used to store the temporally constant signal in another embodiment of the present invention.

FIG. 19 is a flow chart of the operations used to store the temporally constant signal in another embodiment of the present invention. As shown in FIG. 19, the temporally constant signal is stored by performing the operations of providing the sideband signals to the storing flip flop 332 and clocking the storing flip flop 334.

Figure 20:
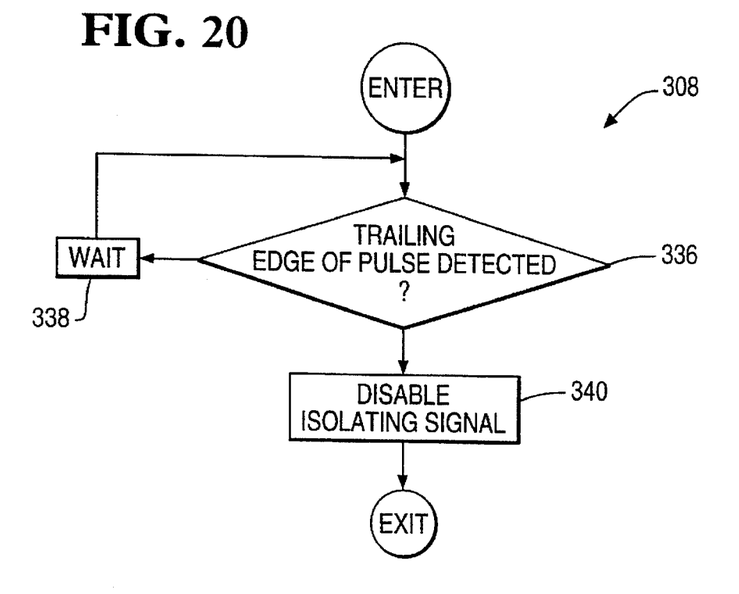
FIG. 20 is a flow chart of the operations used to apply sideband signals to the interface connector in another embodiment of the present invention.

Finally, FIG. 20 is a flow chart of the operations used to apply sideband signals to the interface connector in another embodiment of the present invention. As shown in FIG. 20, the sideband signals are applied to the interface connector by disabling the isolating signal 340 when the trailing edge of the pulse is detected 336.

The foregoing description of the preferred embodiment of the invention has been presented for purposes of illustration and description and is not intended to be exhaustive or to limit the invention to the precise form disclosed. Many modifications and variations are possible in light of the above teaching. It is intended that the scope of the invention be limited not by this detailed description but rather by the claims appended hereto.

What is claimed is:

1. A method of multiplexing temporally constant signals from a Peripheral Component Interconnect (PCI) compliant device with sideband signals, the PCI compliant device being coupled to an external device by an interface connector, the method comprising the steps of:

receiving a command signal in the PCI compliant device from the interface connector;

generating a pulse in the PCI compliant device in response to the command signal via the interface connector;

isolating the sideband signals from the interface connector in response to a leading edge of the pulse;

applying the temporally constant signals to the interface connector until the temporally constant signals are stored in the external device;

isolating the temporally constant signals from the interface connector in response to a trailing edge of the pulse; and applying the sideband signals to the interface connector in response to the trailing edge of the pulse.

2. The method of claim 1 wherein said step of isolating the sideband signals from the interface connector comprises the steps of generating an isolating signal in response to the leading edge of the pulse and isolating the sideband signals from the interface connector in response to the isolating signal.

3. The method of claim 2 wherein said step of generating an isolating signal comprises the steps of providing the pulse to a first flip-flop in said first PCI compliant device, and thereafter clocking said first flip-flop to create an isolating signal.

4. The method of claim 2 wherein said step of isolating the sideband signals from the interface connector comprises the step of providing the isolating signal to a first signal controller for connecting the sideband signals to the interface connector based upon the isolating signal, said first signal controller coupled to the interface connector and the sideband signals and comprising a control input coupled to the isolating signal.

5. The method of claim 1 wherein said step of applying the temporally constant signals to the interface connector comprises the steps of generating an apply signal in response to the leading edge of said pulse, and providing the temporally constant signals to the interface connector in response to the apply signal.

6. The method of claim 5 wherein said step of generating an apply signal comprises the step of inverting an isolating signal.

7. The method of claim 5 wherein said step of providing the temporally constant signals to the interface connector comprises the step of providing the apply signal to a second signal controller for coupling the temporally constant signals to the interface connector based upon the apply signal, said second signal controller coupled to the interface connector and the temporally constant signals and comprising a control input coupled to the apply signal.

8. The method of claim 1 wherein said step of isolating the temporally constant signals from the interface connector comprises the step of negating the apply signal in response to the trailing edge of the pulse.

9. The method of claim 1 wherein said step of applying the sideband signals to the interface connector comprises the step of disabling an isolating signal in response to the trailing edge of the pulse.

10. A method of multiplexing temporally constant signals from a Peripheral Component Interconnect (PCI) compliant device with sideband signals, the PCI compliant device being coupled to an external device by an interface connector, the method comprising the steps of:
receiving a command signal in the external device via the interface connector;
generating a pulse in the external device in response to the command signal;
isolating the sideband signals from the interface connector in response to a leading edge of the pulse;
storing the temporally constant signals in the external device after isolating the sideband signals from the interface connector; and
applying the sideband signals to the interface connector in response to a trailing edge of the pulse.

11. The method of claim 10 wherein said step of isolating the sideband signals from the interface connector comprises the steps of generating an isolating signal in response to the leading edge of the pulse and isolating the sideband signals from the interface connector in response to the isolating signal.

12. The method of claim 11 wherein said step of generating an isolating signal comprises the steps of providing the pulse to a first flip-flop in said external device, and thereafter clocking said first flip-flop to create an isolating signal.

13. The method of claim 11 wherein said step of isolating the sideband signals in response to the isolating signal comprises the step of providing the isolating signal to a signal controller comprising a control input coupled to the isolating signal, said selectable connector coupled to the interface connector and the sideband signals.

14. The method of claim 10 wherein said step of applying the sideband signals to the interface connector comprises the step of disabling an isolating signal in response to the trailing edge of the pulse.

15. The method of claim 10 wherein the step of storing the temporally constant signals in the external device comprises the steps of generating a store command and storing said temporally constant signals in the external device in response to the store command.

16. The method of claim 15 wherein the step of generating a store command comprises the steps of supplying an isolating signal to a store command flip-flop and clocking the store command flip-flop to create the store command.

17. The method of claim 16 wherein the step of storing comprises the step of providing the sideband signals to a storing flip-flop and clocking the storing flip-flop with the store command.

18. An apparatus for multiplexing temporally constant signals from a Peripheral Component Interconnect (PCI) compliant device with sideband signals, the PCI compliant device coupled to an external device by an interface connector, the apparatus comprising:
a control signal generator coupled to the interface connector, said control signal generator for generating a control signal in response to a command signal from the interface connector; and
a selectable connector coupled to the temporally constant signals from the PCI compliant device, the sideband signals, the interface connector, and the control signal generator, said selectable connector alternatively coupling the sideband signals and the temporally constant signals to the interface connector according to the control signal.

19. The apparatus of claim 18, wherein said control signal generator comprises a pulse generator coupled to a means for generating a control signal from the leading edge of the pulse.

20. The apparatus of claim 19, wherein said means for generating a control signal from the leading edge of the pulse comprises a control flip-flop.

21. The apparatus of claim 20 wherein said pulse generator comprises a one-shot circuit.

22. The apparatus of claim 21 wherein said pulse generator comprises a plurality of delay flip-flops coupled in series, an OR gate and an AND gate, the output of each delay flip-flop coupled to said OR gate, and the output of said OR gate and the command signal are coupled to the input of said AND gate.

23. The apparatus of claim 22, wherein said selectable connector comprises a first and a second signal controller means, each comprising a control input, said first signal controller coupled between the temporally constant signals from the PCI compliant device and the interface connector, said first signal controller alternately connecting and disconnecting the temporally constant signals to the interface connector in response to the control signal, and said second signal controller coupled between the sideband signals and the interface connector, the control input of said first signal controller coupled to said control signal, and said second signal controller alternatively disconnecting and connecting the sideband signals to the interface connector in response to the control signal.

24. The apparatus of claim 23, wherein:
said first signal controller comprises a tri-state output buffer for each temporally constant signal, each tri-state output buffer comprising a signal input coupled to a temporally constant signal, a signal output coupled to the interface connector, and a control input coupled to the control signal; and
said second signal controller comprises an inverter, coupled to the control signal, a first and a second tri-state output buffer for each sideband signal, each tri-state output buffer comprising a control input coupled to the inverter, the input of said first tri-state output buffer coupled to the source of said sideband signal, the output of the first tri-state output buffer coupled to the interface connector, the output of said second tri-state output buffer coupled to the destination of said sideband signal and the interface connector.

25. An apparatus for multiplexing temporally constant signals from a Peripheral Component Interconnect (PCI) compliant device with sideband signals, the PCI compliant device coupled to an external device by an interface connector, the apparatus comprising:
a control signal generator coupled to the interface connector for generating an isolating signal in response to a command signal from the interface connector;
a store command generator, coupled to the control signal generator, for generating a store command signal in response to the isolating signal;
a selectable connector coupled to the interface connector, the control signal generator, and the sideband signals for coupling the sideband signals to the interface connector in response to the control signal; and a memory, comprising an input, an output, and a store command input, the input coupled to the interface connector, the output coupled to the external device, and the store command input coupled to the store command signal from the store command generator.

26. The apparatus of claim 25, wherein said control signal generator comprises a pulse generator coupled to a means for generating a control signal from the leading edge of the pulse.

27. The apparatus of claim 26, wherein said means for generating the control signal from the leading edge of the pulse comprises a control flip-flop.

28. The apparatus of claim 27 wherein said pulse generator comprises a one-shot circuit.

29. The apparatus of claim 27 wherein said pulse generator comprises a plurality of delay flip-flops coupled in series, an OR gate and an AND gate, the output of each delay flip-flop coupled to said OR gate, and the output of said OR gate and the command signal are coupled to the input of said AND gate.

30. The apparatus of claim 25 wherein said store command generator comprises a store command flip-flop coupled to the output of a second pulse generating means.

31. The apparatus of claim 25 wherein said selectable connector comprises a signal controller comprising a first and a second tri-state output buffer for each sideband signal, each tri-state output buffer comprising a control input coupled to the isolating signal from the control signal generator, the input of said first tri-state output buffer coupled to the source of said sideband signals in the external device, the output of said first tri-state output buffer coupled to the interface connector, the output of said second tri-state output buffer coupled to the destination of said sideband signals in the external device.

32. The apparatus of claim 25 wherein the memory comprises a storing flip-flop for each temporally constant signal, each storing flip-flop comprising an input, an output, and a clock input each coupled to the store command from the store command generator, the input of each said storing flip-flop coupled to the temporally constant signal at the interface connector, and the output of each said storing flip-flop coupled to the external device.

* * * * *